(12) United States Patent
Mukai

(10) Patent No.: US 7,179,548 B2
(45) Date of Patent: Feb. 20, 2007

(54) POLYCRYSTALLINE STRUCTURE FILM AND METHOD OF MAKING THE SAME

(75) Inventor: Ryoichi Mukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/007,129

(22) Filed: Dec. 8, 2004

(65) Prior Publication Data

US 2005/0100765 A1 May 12, 2005

Related U.S. Application Data

(63) Continuation of application No. PCT/JP2002/010539, filed on Oct. 10, 2002.

(51) Int. Cl.
*G11B 5/66* (2006.01)
*G11B 5/70* (2006.01)

(52) U.S. Cl. .................................................... 428/828

(58) Field of Classification Search ................ 428/828, 428/828.1, 827
See application file for complete search history.

(56) References Cited

U.S. PATENT DOCUMENTS

| 6,068,739 | A | 5/2000 | Suzuki et al. |
| 6,171,676 | B1 | 1/2001 | Mukai et al. |
| 6,562,453 | B1 | 5/2003 | Futamoto et al. |
| 6,641,934 | B1 | 11/2003 | Suzuki et al. |
| 6,723,450 | B2 * | 4/2004 | Do et al. .................... 428/828 |
| 6,770,389 | B2 | 8/2004 | Futamoto et al. |
| 6,777,078 | B2 | 8/2004 | Maeda et al. |

| 2002/0041980 | A1 | 4/2002 | Suzuki et al. |
| 2003/0215675 | A1 | 11/2003 | Inaba et al. |

FOREIGN PATENT DOCUMENTS

| JP | 9-259425 | 10/1997 |
| JP | 11-353648 | 12/1999 |
| JP | 2000-268340 | 9/2000 |
| JP | 2001-023140 | 1/2001 |
| JP | 2001-101645 | 4/2001 |
| JP | 2001-126239 | 5/2001 |
| JP | 2001-189010 | 7/2001 |
| JP | 2002-123920 | 4/2002 |
| JP | 2002-208129 | 7/2002 |
| JP | 2002-216330 | 8/2002 |
| JP | 2002-251720 | 9/2002 |

* cited by examiner

*Primary Examiner*—Holly Rickman
(74) *Attorney, Agent, or Firm*—Greer, Burns & Crain, Ltd

(57) ABSTRACT

First magnetic crystalline grains are located at spaced positions on the surface of a base layer in a polycrystalline structure film. Magnetic interaction can reliably be prevented between the adjacent first magnetic crystalline grains. An amorphous material or a non-magnetic material covers over the first magnetic crystalline grains. An orientation controlling layer covering over the first magnetic crystalline grains and the amorphous or non-magnetic material on the base layer. Second magnetic crystalline grains are located at spaced locations on the surface of the orientation controlling layer. The orientation controlling layer serves to set the orientation in a predetermined direction in the second magnetic crystalline grains. Since the orientation of the magnetic crystalline grains can be aligned in a predetermined direction, the magnetic field of a sufficient intensity can be leaked out of the polycrystalline structure film.

10 Claims, 7 Drawing Sheets

POLYCRYSTALLINE STRUCTURE FILM AND METHOD OF MAKING THE SAME

This is a continuation of International PCT Application No. PCT/JP2002/010539 filed Oct. 10, 2002.

BACKGROUND OF THE INVENTION

1. Field of the Invention

The present invention relates to a polycrystalline structure film often utilized for a magnetic recording layer of a magnetic recording medium such as a hard disk (HD), for example, and to a method of making the same.

2. Description of the Prior Art

A continuous layer of a polycrystalline structure is often utilized for a magnetic recording layer in the technical field of magnetic recording media. The continuous layer of the polycrystalline structure includes minute Co alloy crystalline grains formed on the surface of the base layer based on the epitaxy. The continuous layer of the polycrystalline structure allows Cr atoms to diffuse along grain boundaries between the adjacent Co alloy crystalline grains. The Cr atoms form non-magnetic walls between the adjacent Co alloy crystalline grains, so that magnetic interaction is reliably prevented between the adjacent Co alloy crystalline grains. Magnetic domains are established in the individual crystalline grains. As conventionally known, fine Co alloy crystalline grains serve to reliably reduce noise in a read signal for magnetic information.

For example, an ordered alloy such as $Fe_{50}Pt_{50}$ (atom %) exhibits a remarkably larger crystalline magnetic anisotropy energy as compared with Co alloy. The crystalline magnetic anisotropy energy of the ordered alloy often reaches over $1\times10^6$ $J/m^3$, for example. A larger crystalline magnetic anisotropy energy serves to maintain magnetization within a fine crystalline grain. On the other hand, a smaller crystalline magnetic anisotropy energy causes loss of magnetization within a fine crystalline grain due to thermal agitation. Utilization of an ordered alloy is desired in place of Co alloy so as to realize fine crystalline grains. However, a continuous layer of a polycrystalline structure made of an ordered alloy cannot enjoy the aforementioned diffusion of non-magnetic atoms along the grains boundaries. Magnetic interaction should reliably be cut off between the adjacent crystalline grains made of an ordered alloy.

SUMMARY OF THE INVENTION

It is accordingly an object of the present invention to provide a polycrystalline structure contributing to a reliable realization of fine magnetic crystalline grains, and a method of making the same.

According to a first aspect of the present invention, there is provided a polycrystalline structure film comprising: magnetic crystalline grains spaced from each other on the surface of a base layer; an amorphous material covering over the magnetic crystalline grains; an orientation controlling layer covering over the magnetic crystalline grains and the amorphous material on the base layer, said orientation controlling layer made of non-magnetic crystals oriented in a predetermined direction; and magnetic crystalline grains spaced from each other on the surface of the orientation controlling layer, said magnetic crystalline grains oriented in a predetermined direction. Here, the amorphous material may comprise a non-magnetic material such as $SiO_2$, for example. Alternatively, the amorphous material may comprise a metallic oxide, a metallic nitride, or the like.

The polycrystalline structure film enables generation of spaces between the adjacent magnetic crystalline grains on the surfaces of the base layer and orientation controlling layer. Specifically, spaces are defined between the adjacent magnetic crystalline grains. The individual magnetic crystalline grains are independently located, so that magnetic interaction can reliably be prevented between the adjacent magnetic crystalline grains. Magnetic domains can independently be established in the individual magnetic crystalline grains.

In addition, the polycrystalline structure film allows an increased overall thickness of the magnetic crystalline grains irrespective of the interposal of the amorphous layer and the orientation controlling layer between the upper and lower magnetic crystalline grains. Since the orientation of the magnetic crystalline grains can be aligned in a predetermined direction, the magnetic field of a sufficient intensity can be leaked out of the polycrystalline structure film.

The magnetic crystalline grains may be made of an ordered alloy. The magnetic crystalline grains of an ordered alloy exhibits a remarkably larger crystalline magnetic anisotropy energy as compared with non-ordered Co alloy. The crystalline magnetic anisotropy energy of the ordered alloy often reaches over $1\times10^6$ $J/m^3$, for example. A larger crystalline magnetic anisotropy energy serves to maintain magnetization within a fine crystalline grain. The ordered alloy may have $L1_0$ structure. The ordered alloy may be selected from a group consisting of $Fe_{50}Pt_{50}$ (atom %), $Fe_{50}Pd_{50}$ (atom %) and $Co_{50}Pt_{50}$ (atom %), for example.

A specific method may be employed to make the aforementioned polycrystalline structure film according to the first aspect. The method may comprise: forming first magnetic crystalline grains on a surface of a base layer, said first magnetic crystalline grains spaced from each other; forming an amorphous layer covering over the first magnetic crystalline grains; forming a crystalline layer on the amorphous layer, said crystalline layer oriented in a predetermined direction; and forming second magnetic crystalline grains on a surface of the crystalline layer, said second magnetic crystalline grains spaced from each other.

The method allows formation of the second magnetic crystalline grains on the surface of the crystalline layer including crystals oriented in a predetermined direction. The orientation of the second magnetic crystalline grains can reliably be aligned in a specific direction. Moreover, the amorphous layer is interposed between the first magnetic crystalline grains and the crystalline layer. The amorphous layer serves to sufficiently reduce interfacial reaction between the first magnetic crystalline grains and the crystalline layer. The orientation can thus reliably be maintained in the individual first magnetic crystalline grains during the subsequent process of production.

The method may further comprise: depositing first and second metallic atoms in a predetermined ratio on the surface of the base layer in forming the first magnetic crystalline grains; and subjecting the first and second metallic atoms on the surface of the base layer to heat. Aggregation of the first and second metallic atoms is induced on the base layer in response to the applied heat. The aggregation results in establishment of the first magnetic crystalline grains including the first and second metallic atoms on the surface of the base layer. Since the migration of the first and second metallic atoms is induced to form the first magnetic crystalline grains, spaces are defined between the adjacent first magnetic crystalline grains. Moreover, the first magnetic crystalline grains are equally arranged or dispersed on the surface of the base layer.

Likewise, the method may further comprise: depositing first and second metallic atoms in a predetermined ratio on the surface of the crystalline layer in forming the second magnetic crystalline grains; and subjecting the first and second metallic atoms on the surface of the crystalline layer to heat. Aggregation of the first and second metallic atoms is induced on the crystalline layer in response to the applied heat. The aggregation results in establishment of the second magnetic crystalline grains including the first and second metallic atoms on the surface of the crystalline layer. Since the migration of the first and second metallic atoms is induced to form the second magnetic crystalline grains, spaces are defined between the adjacent second magnetic crystalline grains. Moreover, the second magnetic crystalline grains are equally arranged or dispersed on the surface of the crystalline layer.

Here, repeated deposition of the first and second metallic atoms and heat treatment causes the aggregation of the first and second atoms toward the existing magnetic crystalline grains. The aggregation results in the growth of the existing magnetic crystalline grains. The diameter or size of the magnetic crystalline grains can be controlled in this manner. A uniform disposition of the magnetic crystalline grains can be maintained. In this case, the deposited amount of the first and second metallic atoms should be set to achieve a thickness smaller than 1.0 nm, preferably smaller than 0.5 nm.

The aforementioned crystalline layer serves to prevent the first and second metallic atoms from receiving any influence from the existing magnetic crystalline grains in forming new magnetic crystalline grains. Aggregation of the first and second metallic atoms for the new magnetic crystalline grains can be achieved without an influence from the existing magnetic crystalline grains. The existing magnetic crystalline grains are surely prevented from further growing. The magnetic crystalline grains are allowed to anew grow on the crystalline layer. Accordingly, spaces are defined between the adjacent magnetic crystalline grains in the same manner as the existing magnetic crystalline grains. Moreover, the magnetic crystalline grains are equally arranged or dispersed on the surface of the crystalline layer.

In this case, the energy of the heat applied to form the second magnetic crystalline grains may be set smaller than that of the heat applied to form the first magnetic crystalline grains. When the heat is applied to form the second magnetic crystalline grains in the aforementioned manner, the existing first magnetic crystalline grains serve to radiate the heat. The heat radiation from the first magnetic crystalline grains is supposed to realize the aggregation of the second magnetic crystalline grains with a smaller energy of an applied heat.

The crystalline layer may be made of MgO, for example. In this case, the amorphous layer may be cooled prior to formation of the crystalline layer. Sputtering of MgO at a normal or room temperature enables the orientation in the (100) plane in the crystals of MgO. This crystalline layer serves to establish the orientation in the (001) plane in the magnetic crystalline grains. The orientation can reliably be aligned in a predetermined direction in the individual magnetic crystalline grains on the crystalline layer.

According to a second aspect of the present invention, there is provided a polycrystalline structure film comprising: magnetic crystalline grains spaced from each other on the surface of a base layer; a non-magnetic material distributed over surfaces of the magnetic crystalline grains, said non-magnetic material generated based on atoms included in the magnetic crystalline grains; an orientation controlling layer covering over the magnetic crystalline grains and the non-magnetic material on the base layer, said orientation controlling layer made of non-magnetic crystals oriented in a predetermined direction; and magnetic crystalline grains spaced from each other on the surface of the orientation controlling layer, said magnetic crystalline grains oriented in a predetermined direction. Here, the non-magnetic material may comprise an oxide, a nitride, or the like.

The polycrystalline structure film enables avoidance of magnetic interaction between the adjacent magnetic crystalline grains in the same manner as described above. Magnetic domains can independently be established in the individual magnetic crystalline grains. In addition, the polycrystalline structure film allows an increased overall thickness of the magnetic crystalline grains. Since the orientation is aligned in a predetermined direction in the magnetic crystalline grains, the magnetic field of a sufficient intensity can be leaked out of the polycrystalline structure film. The magnetic crystalline grains may be made of an ordered alloy. The ordered alloy may have $L1_0$ structure.

A specific method may be employed to form the polycrystalline structure film according to the second aspect. The method may comprise: forming first magnetic crystalline grains on the surface of a base layer, said first magnetic crystalline grains spaced from each other; generating a non-magnetic material over the surfaces of the first magnetic crystalline grains based on atoms included in the first magnetic crystalline grains; forming a crystalline layer on the non-magnetic material, said crystalline layer oriented in a predetermined direction; and forming second magnetic crystalline grains on the surface of the crystalline layer, said second magnetic crystalline grains spaced from each other.

The method enables the orientation of the second magnetic crystalline grains in a predetermined direction. Moreover, the non-magnetic material is interposed between the first magnetic crystalline grains and the crystalline layer. The non-magnetic material serves to sufficiently reduce interfacial reaction between the first magnetic crystalline grains and the crystalline layer. The orientation can thus reliably be maintained in the individual first magnetic crystalline grains during the subsequent process of production.

The method may further comprise: depositing first and second metallic atoms in a predetermined ratio on the surface of the base layer in forming the first magnetic crystalline grains; and subjecting the first and second metallic atoms on the surface of the base layer to heat. Likewise, the method may further comprise: depositing first and second metallic atoms in a predetermined ratio on the surface of the crystalline layer informing the second magnetic crystalline grains; and subjecting the first and second metallic atoms on the surface of the crystalline layer to heat. Here, the energy of the heat applied to form the second magnetic crystalline grains may be set smaller than that of the heat applied to form the first magnetic crystalline grains.

The aforementioned polycrystalline structure films may be utilized in the magnetic recording medium such as a magnetic recording disk. The base layer, the magnetic crystalline grains, the amorphous layer, the non-magnetic layer, and the orientation controlling layer may be formed on the surface of a support member such as a substrate, for example. The fine magnetic crystalline grains magnetically isolated from each other in the aforementioned manner serve to greatly reduce transition noise between the adjacent recording tracks on the surface of the magnetic recording medium. The fine magnetic crystalline grains greatly contribute to improvement in the density of the recording tracks and the recording capacity of the magnetic recording medium.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
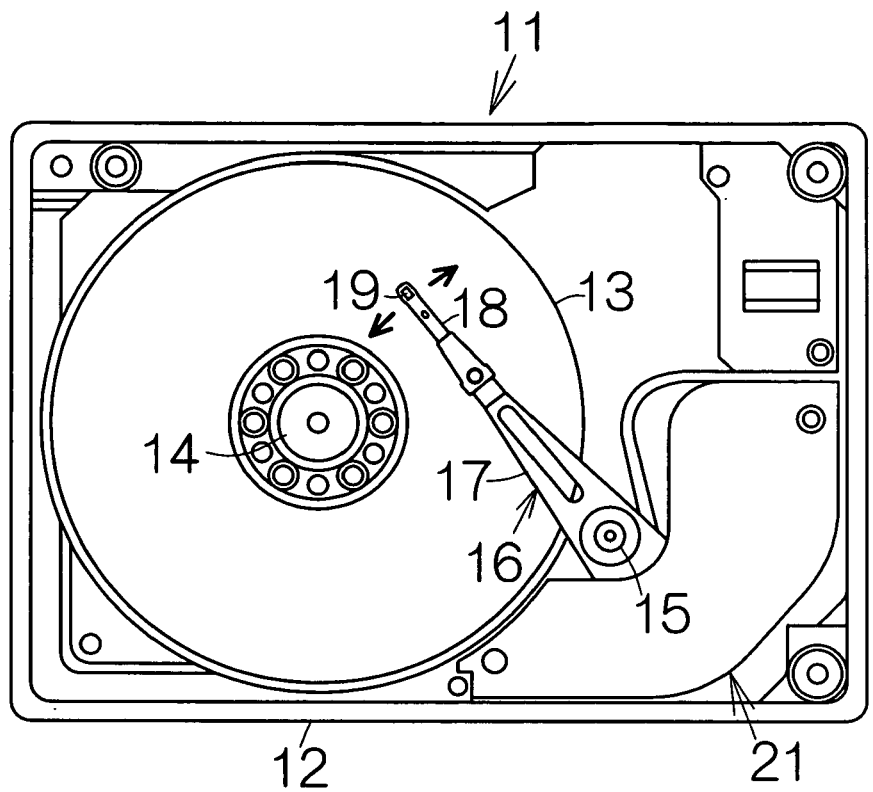
FIG. 1 is a plan view schematically illustrating the structure of a hard disk drive (HDD) as a specific example of a magnetic recording medium drive or storage device.

FIG. 1 schematically illustrates the interior structure of a hard disk drive (HDD) 11 as an example of a magnetic recording medium drive or storage device. The HDD 11 includes a box-shaped main enclosure 12 defining an inner space of a flat parallelepiped, for example. At least one magnetic recording disk 13 is incorporated in the inner space within the main enclosure 12. The magnetic recording disk 13 is mounted on the driving shaft of a spindle motor 14. The spindle motor 14 is allowed to drive the magnetic recording disk 13 for rotation at a higher revolution rate such as 7,200 rpm, 10,000 rpm, or the like, for example. A cover, not shown, is coupled to the main enclosure 12 so as to define the closed inner space between the main enclosure 12 and itself.

A head actuator 16 is mounted on a vertical support shaft 15 in the inner space of the main enclosure 12. The head actuator 16 includes rigid actuator arms 17 extending in the horizontal direction from the vertical support shaft 15, and an elastic head suspension 18 fixed to the tip end of the actuator arm 17 so as to extend forward from the actuator arm 17. As conventionally known, a flying head slider 19 is cantilevered at the tip end of the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive airflow generated along the rotating magnetic recording disk 13. The airflow serves to generate a lift on the flying head slider 19. The flying head slider 19 is thus allowed to keep flying above the surface of the magnetic recording disk 13 during the rotation of the magnetic recording disk 13 at a higher stability established by the balance between the lift and the urging force of the head suspension 18.

A read/write magnetic transducer or head element, not shown, is mounted on the flying head slider 19 in a conventional manner. The read/write magnetic transducer includes a read head element and a write head element. The read head element may include a giant magnetoresistive (GMR) element or a tunnel-junction magnetoresistive (TMR) element designed to discriminate magnetic bit data on the magnetic recording disk 13 by utilizing variation in the electric resistance of a spin valve film or a tunnel-junction film, for example. The write head element may include a thin film magnetic head designed to write magnetic bit data into the magnetic recording disk 13 by utilizing a magnetic field induced at a thin film coil pattern.

When the head actuator 16 is driven to swing about the support shaft 15 during the flight of the flying head slider 19, the flying head slider 19 is allowed to cross the recording tracks defined on the magnetic recording disk 13 in the radial direction of the magnetic recording disk 13. This radial movement serves to position the read/write magnetic transducer on the flying head slider 19 right above a target recording track on the magnetic recording disk 13. In this case, a power source 21 such as a voice coil motor (VCM) can be employed to realize the swinging movement of the head actuator 16, for example. As conventionally known, in the case where two or more magnetic recording disks 13 are incorporated within the inner space of the main enclosure 12, a pair of the actuator arms 17 and a pair of the head sliders 19 are disposed between the adjacent magnetic recording disks 13.

Figure 2:
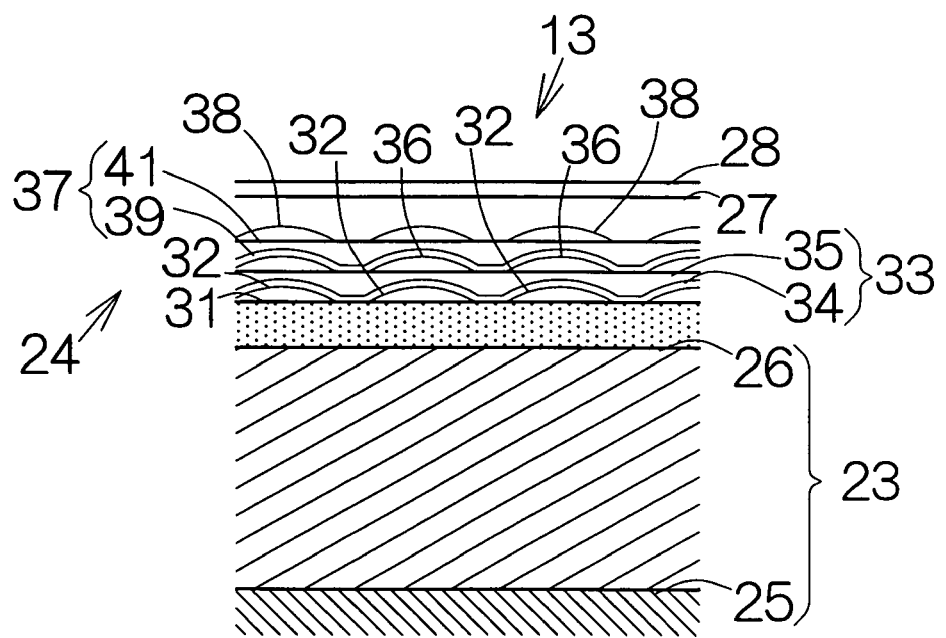
FIG. 2 is an enlarged partial sectional view for schematically illustrating in detail the structure of a magnetic recording disk including a polycrystalline structure film according to a first embodiment of the present invention.

FIG. 2 illustrates in detail the structure of the magnetic recording disk 13. The magnetic recording disk 13 includes a substrate 23 as a support member, and polycrystalline structures 24 extending over the front and back surfaces of the substrate 23, respectively. The substrate 23 may comprise a disk-shaped Si body 25 and amorphous $SiO_2$ laminations 26 covering over the front and back surfaces of the Si body 25, for example. A glass or aluminum substrate may be employed in place of the substrate 23 of the aforementioned type. Magnetic information data is recorded in the polycrystalline structures 24. The polycrystalline structure 24 is covered with a protection overcoat 27 and a lubricating agent film 28. A carbon material such as diamond-like-carbon (DLC) may be utilized to form the protection overcoat 27.

The polycrystalline structure 24 according to a first embodiment of the present invention includes a base layer 31 extending over the surface of the substrate 23. The base layer 31 is made of a crystalline layer including crystals oriented in a predetermined direction. The crystalline layer exhibits a non-magnetic property. MgO may be employed for the base layer 31 so as to establish the crystalline layer, for example. The individual crystals of MgO are oriented along the (100) plane.

A plurality of first magnetic crystalline grains 32 exist on the surface of the base layer 31 at spaced locations. The first magnetic crystalline grains 32 take the islands structure. The exposed surface of the base layer 31 thus serves to isolate the adjacent first magnetic crystalline grains 32 from each other. Specifically, a space is defined between the adjacent first magnetic crystalline grains 32. The first magnetic crystalline grains 32 are made of an ordered alloy. The ordered alloy may have the $L1_0$ structure. The ordered alloy of the type may ensure the crystalline magnetic anisotropy energy reaching over $1 \times 10^6$ $J/m^3$, for example. The ordered alloy may be selected from a group consisting of $Fe_{50}Pt_{50}$(atom %), $Fe_{50}Pd_{50}$(atom %) and $Co_{50}Pt_{50}$(atom %), for example. The orientation is established in the (001) plane in the individual first magnetic crystalline grains 32. Accordingly, the axis of easy magnetization is aligned in the direction perpendicular to the surface of the substrate 23.

The polycrystalline structure film 24 further includes a first isolation layer 33 covering over the first magnetic crystalline grains 32 on the surface of the base layer 31. The first isolation layer 33 includes an amorphous layer 34 covering over the first magnetic crystalline grains 32 on the surface of the base layer 31, and a crystalline layer 35 covering over the first magnetic crystalline grains 32 and the amorphous layer 34 on the surface of the base layer 31. The amorphous layer 34 may be made of a non-magnetic material such as $SiO_2$, for example. Alternatively, a metallic oxide, a metallic nitride, or the like, may be employed to form the amorphous layer 34. The crystalline layer 35 exhibits the non-magnetic property, for example. The individual crystals in the crystalline layer 35 are oriented in a predetermined direction. MgO may be employed to form the crystalline layer 35, for example. The orientation is established in the (100) plane in the individual crystals of the MgO film.

A plurality of second magnetic crystalline grains 36 exist on the surface of the first isolation layer 33 at spaced locations. The second magnetic crystalline grains 36 take the islands structure. The exposed surface of the first isolation layer 33 thus serves to isolate the adjacent second magnetic crystalline grains 36 from each other. Specifically, a space is defined between the adjacent second magnetic crystalline grains 36. The second magnetic crystalline grains 36 have the structure identical to those of the aforementioned first magnetic crystalline grains 32. The orientation is established in the (001) plane in the individual second magnetic crystalline grains 36. Accordingly, the axis of easy magnetization is aligned in the direction perpendicular to the surface of the substrate 23.

The polycrystalline structure film 24 further includes a second isolation layer 37 covering over the second magnetic crystalline grains 36 on the surface of the first isolation layer 33, and a third magnetic crystalline grains 38 existing on the surface of the second isolation layer 37 at spaced locations. The second isolation layer 37 may include an amorphous layer 39 and a crystalline layer 41 in the same manner as the first isolation layer 33. The third magnetic crystalline grains 38 may have the structure and property identical to those of the first and second magnetic crystalline grains 32, 36. The crystalline layer 41 serves to establish the orientation along the (001) plane in the third magnetic crystalline grains 38.

Remarkably fine magnetic crystalline grains 32, 36, 38 can be obtained in a layer separated with the isolation layers 33, 37 in the polycrystalline structure 24. Moreover, since the individual magnetic crystalline grains 32, 36, 38 independently exist, establishment of magnetic interaction can reliably be prevented between the adjacent magnetic crystalline grains 32, 36, 38. Magnetic domains can independently be established in the individual magnetic crystalline grains 32, 36, 38. The fine magnetic crystalline grains 32, 36, 38 magnetically isolated from each other in this manner serve to greatly reduce transition noise between the adjacent recording tracks on the surface of the magnetic recording disk 13. The fine magnetic crystalline grains 32, 36, 38 greatly contribute to improvement in the density of the recording tracks and the recording capacity of the magnetic recording disk 13.

In addition, the polycrystalline structure film 24 allows an increased overall thickness of the magnetic crystalline grains 32, 36, 38 irrespective of the interposal of the non-magnetic isolation layer 33, 37 between the upper and lower magnetic crystalline grains 32, 36, 38. Since the axis of easy magnetization is aligned in the vertical direction in the magnetic crystalline grains 32, 36, 38, the magnetic field of a sufficient intensity can be leaked out of the polycrystalline structure film 24. The polycrystalline structure film 24 of the type greatly contribute to improvement in the density of the recording tracks and the recording capacity of the magnetic recording disk 13.

Next, description will be made on a method of making the magnetic recording disk 13. First of all, the disk-shaped substrate 23 is prepared. The substrate 23 is set in a sputtering apparatus. A vacuum condition is established in a chamber of the sputtering apparatus. The substrate 23 is subjected to a heat treatment at 350 degrees Celsius approximately for two minutes, for example. The heat treatment serves to remove gas from the surface of the substrate 23. The substrate 23 is then cooled down to a normal or room temperature.

Figure 3:
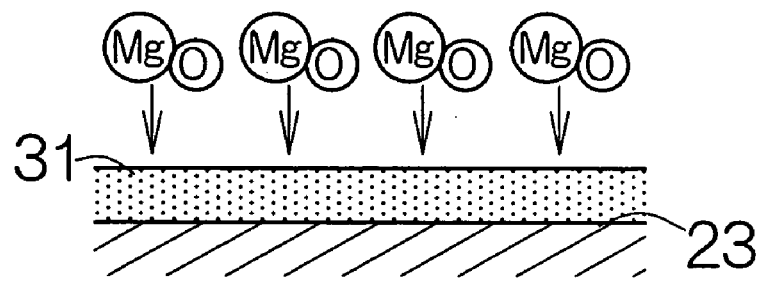
FIG. 3 is an enlarged partial sectional view of a substrate for schematically illustrating a process of forming a base layer on the substrate.

As shown in FIG. 3, MgO is deposited on the surface of the substrate 23 in the sputtering apparatus in the vacuum condition. Specifically, a so-called radio or high frequency sputtering is effected in the sputtering apparatus. The base layer 31 made of MgO is formed on the surface of the substrate 23. The thickness of the base layer 31 is designed to reach 7.5 nm approximately. The room temperature is maintained during the radio frequency (RF) sputtering, so that the orientation is aligned in the (100) plane in the individual non-magnetic crystalline grains of the base layer 31.

Figure 4:
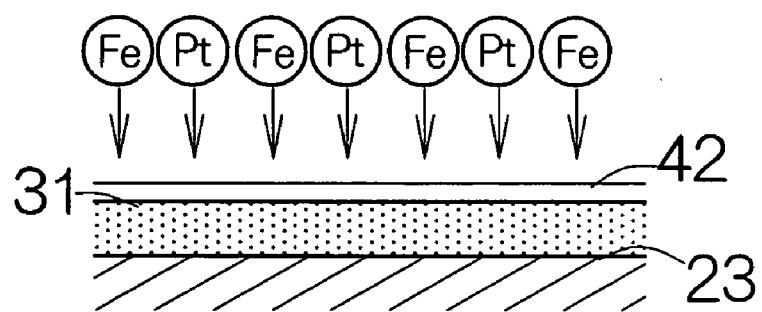
FIG. 4 is an enlarged partial sectional view of the substrate for schematically illustrating a process of forming a $Fe_{50}Pt_{50}$ alloy layer over the substrate.

As shown in FIG. 4, Fe atoms and Pt atoms are thereafter allowed to fall on the surface of the base layer 31 in the sputtering apparatus in the vacuum condition, for example. Here, a direct current (DC) sputtering is utilized to deposit first and second metallic atoms, namely Fe and Pt atoms, in a predetermined ratio. A target of the DC sputtering may include the Fe and Pt atoms in the ratio of 50 atom % to 50 atom %. A $Fe_{50}Pt_{50}$ alloy layer 42 having the thickness of 0.5 nm approximately is in this manner formed on the surface of the base layer 31.

Figure 5:
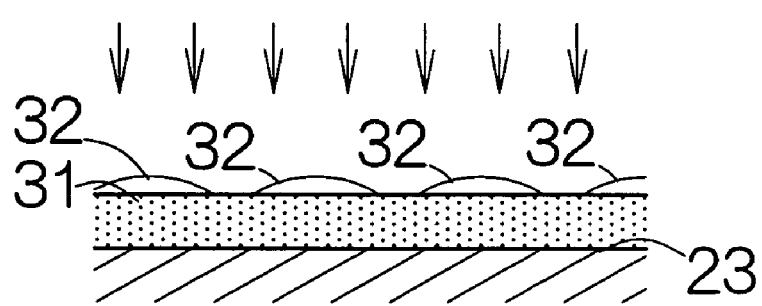
FIG. 5 is an enlarged partial sectional view of the substrate for schematically illustrating a process of forming magnetic crystalline grains based on heat treatment.

The $Fe_{50}Pt_{50}$ alloy layer 42 is then subjected to heat treatment on the substrate 23. The $Fe_{50}Pt_{50}$ alloy layer 42 is exposed to heat of 450 degrees Celsius under a vacuum condition. The heat treatment is maintained for five minutes. Aggregation of $Fe_{50}Pt_{50}$ alloy layer 42 is induced on the base layer 31 based on the heat. As shown in FIG. 5, the first magnetic crystalline grains 32, made of an ordered alloy including the Fe and Pt atoms, for example, are formed on the surface of the base layer 31 because of the aggregation. Since the migration of the Fe and Pt atoms is induced to form the first magnetic crystalline grains 32, spaces are defined between the adjacent magnetic crystalline grains 32. Moreover, the first magnetic crystalline grains 32 are equally arranged or dispersed on the surface of the base layer 31. The MgO serves to establish the orientation in the (001) plane in the individual first magnetic crystalline grains 32.

Figure 6:
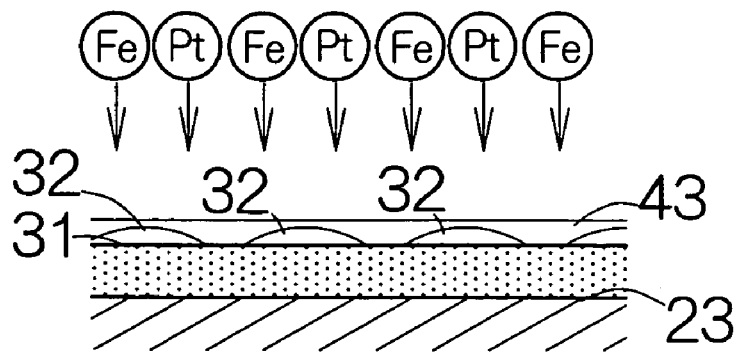
FIG. 6 is an enlarged partial sectional view of the substrate for schematically illustrating a process of forming a $Fe_{50}Pt_{50}$ alloy layer covering over the magnetic crystalline grains on the substrate.

As shown in FIG. 6, the DC sputtering is thereafter again utilized to deposit Fe atoms and Pt atoms on the surface of the base layer 31 in a vacuum condition. The Fe and Pt atoms are deposited in a predetermined ratio in the same manner as described above. A target of the DC sputtering may include the Fe and Pt atoms in the ratio of 50 atom % to 50 atom %. A $Fe_{50}Pt_{50}$ alloy layer 43 having the thickness of 0.5 nm approximately is in this manner formed on the surface of the base layer 31. The $Fe_{50}Pt_{50}$ alloy layer 43 covers over the first magnetic crystalline grains 32 on the base layer 31. Here, the substrate 23 may be maintained at the temperature of the heat treatment during the deposition of the Fe and Pt atoms.

Figure 7:
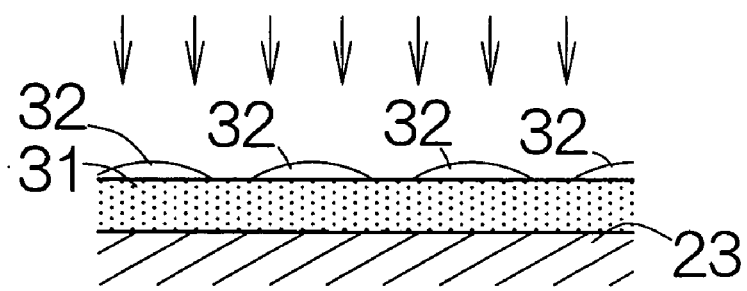
FIG. 7 is an enlarged partial sectional view of the substrate for schematically illustrating a process of growing the magnetic crystalline grains based on heat treatment.

The $Fe_{50}Pt_{50}$ alloy layer 43 is then subjected to heat treatment. Heat of 450 degrees Celsius is applied to the $Fe_{50}Pt_{50}$ alloy layer 43 in a vacuum condition. The heat treatment is maintained for one minute. The applied heat induces aggregation of the $Fe_{50}Pt_{50}$ alloy layer 43 on the base layer 31. The Fe and Pt atoms of the $Fe_{50}Pt_{50}$ alloy layer 34 move toward the existing first magnetic crystalline grains 32. The aggregation helps the first magnetic crystalline grains 32 of the ordered alloy to grow on the surface of the base layer 31, as shown in FIG. 7. The density and/or size of the magnetic crystalline grains 32 can be controlled based on the thickness of the $Fe_{50}Pt_{50}$ alloy layers 42, 43 as well as the frequency of the deposition and heat treatment.

Figure 8:
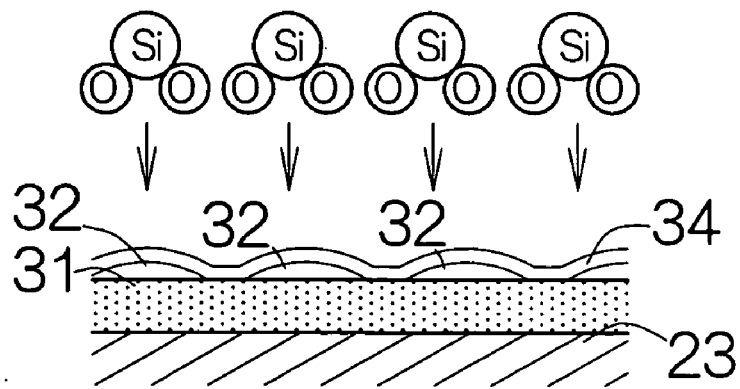
FIG. 8 is an enlarged partial sectional view of the substrate for schematically illustrating a process of forming $SiO_2$ layer covering over the magnetic crystalline grains.

As shown in FIG. 8, $SiO_2$ is deposited on the surface of the base layer 31 in a vacuum condition after the establishment of the first magnetic crystalline grains 32. The RF sputtering is effected. The amorphous layer 34 of $SiO_2$ having the thickness of 2.0 nm approximately is formed. The amorphous layer 34 covers over the first magnetic crystalline grains 32 on the surface of the base layer 31.

Figure 9:
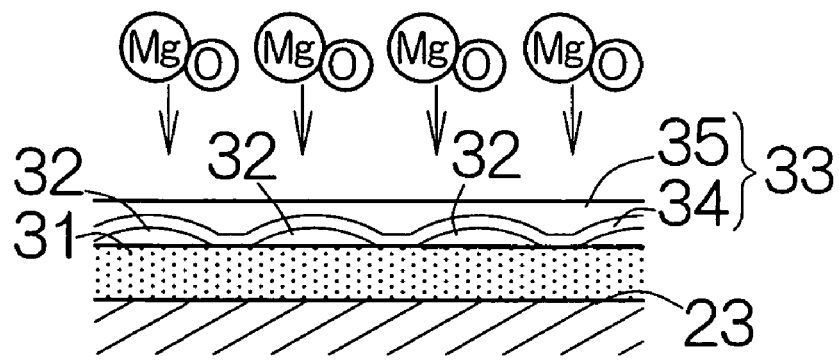
FIG. 9 is an enlarged partial sectional view of the substrate for schematically illustrating a process of a MgO film on the surface of the $SiO_2$ layer.

The formed amorphous layer 34 is cooled down until the temperature of the amorphous layer 34 reaches a normal or room temperature. MgO is then deposited on the surface of the amorphous layer 34 in the vacuum atmosphere based on the RF sputtering, as shown in FIG. 9. The crystalline layer 35 of MgO having the thickness of 5.0 nm approximately is thus formed on the surface of the amorphous layer 34. The room temperature is maintained during the RF sputtering, so that the orientation is aligned in the (100) plane in the individual non-magnetic crystalline grains of the crystalline layer 35. The first isolation layer 33 is formed in this manner. Heat treatment may be applied to the substrate 23 along with the first isolation layer 33 after the establishment of the first isolation layer 33.

Figure 10:
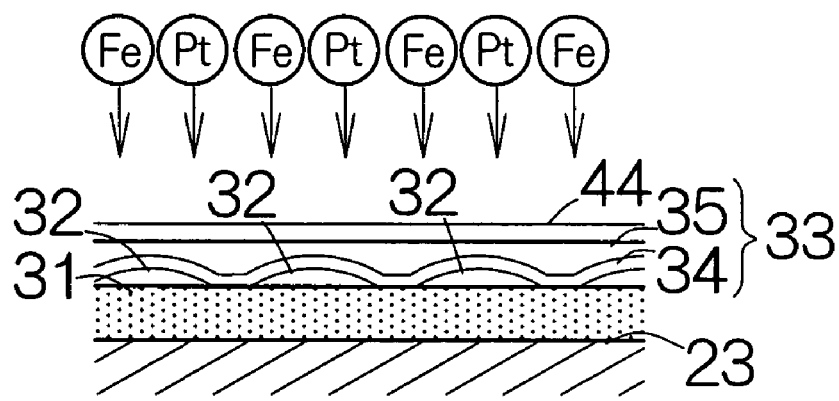
FIG. 10 is an enlarged partial sectional view of the substrate for schematically illustrating a process of forming a $Fe_{50}Pt_{50}$ alloy layer on the surface of a first isolation layer.

As shown in FIG. 10, the DC sputtering is thereafter again utilized to deposit Fe atoms and Pt atoms on the surface of the first isolation layer 33 in a vacuum condition. The Fe and Pt atoms are deposited in a predetermined ratio in the same manner as described above. A target of the DC sputtering may include the Fe and Pt atoms in the ratio of 50 atom % to 50 atom %. A $Fe_{50}Pt_{50}$ alloy layer 44 having the thickness of 0.4 nm approximately is in this manner formed on the surface of the first isolation layer 33. Here, the substrate 23 may be maintained at the temperature of the heat treatment during the deposition of the Fe and Pt atoms.

Figure 11:
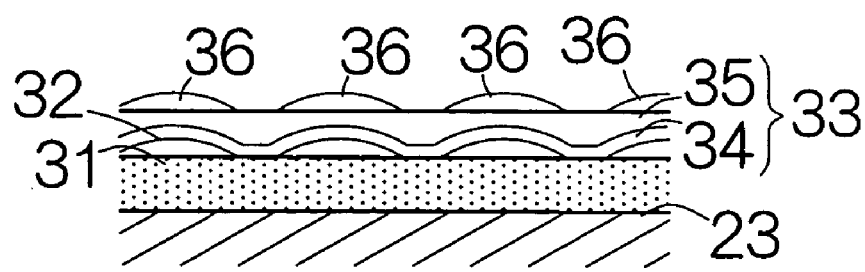
FIG. 11 is an enlarged partial sectional view of the substrate for schematically illustrating a process of forming magnetic crystalline grains on the first isolation layer based on heat treatment.

The $Fe_{50}Pt_{50}$ alloy layer 44 is then subjected to heat treatment. Heat of 450 degrees Celsius is applied to the $Fe_{50}Pt_{50}$ alloy layer 44 in a vacuum condition. The heat treatment is maintained for one minute. The applied heat induces aggregation of the $Fe_{50}Pt_{50}$ alloy layer 44 on the first isolation layer 33. The aggregation serves to establish the second magnetic crystalline grains 36 of an ordered alloy including Fe and Pt atoms on the surface of the first isolation layer 33, as shown in FIG. 11. Here, the aggregation is achieved without the influence of the existing first magnetic crystalline grains 32. The first magnetic crystalline grains 32 are surely prevented from growing. The second magnetic crystalline grains 36 are allowed to a new grow on the first isolation layer 33. Accordingly, spaces are defined between the adjacent second magnetic crystalline grains 36 in the same manner as the first magnetic crystalline grains 32. Moreover, the second magnetic crystalline grains 36 are equally arranged or dispersed on the surface of the isolation layer 33. The MgO serves to establish the orientation in the (001) plane in the individual second magnetic crystalline grains 36.

In this case, the amorphous layer 34 is interposed between the first magnetic crystalline grains 32 and the crystalline layer 35. The amorphous layer 34 serves to sufficiently reduce interfacial reaction between the first magnetic crystalline grains 32 and the crystalline layer 35. The orientation can thus reliably be maintained in the individual first magnetic crystalline grains 32.

The heat treatment of 450 degrees Celsius is maintained for five minutes so as to form the first magnetic crystalline grains 32 in the aforementioned manner. On the other hand, the inventor has confirmed that the heat treatment of one minute still enables the aggregation of the second magnetic crystalline grains 36 after the establishment of the first magnetic crystalline grains 32. In other words, the energy of the heat applied to form the second magnetic crystalline grains 36 may be set smaller than that of the heat applied to form the first magnetic crystalline grains 32. It has been proven that heat radiation from the first magnetic crystalline grains 32 is supposed to realize establishment of the second magnetic crystalline grains 36 with a smaller energy of heat.

Thereafter, the amorphous layer 39 having the thickness of 2.0 nm approximately and the crystalline layer 41 having the thickness of 5.0 nm approximately are formed on the surface of the first isolation layer 33 in the same manner as described above. The second isolation layer 37 is thus established. The third magnetic crystalline grains 38 including Fe and Pt atoms are then formed on the surface of the second isolation layer 37 in the same manner as the second magnetic crystalline grains 36. The polycrystalline structure film 24 can be obtained in this manner.

The inventor has examined the property of an example of the polycrystalline structure film 24. A high resolution scanning electron microscope (HR-SEM) was employed. The inventor has observed the first to third magnetic crystalline grains 32, 36, 38 existing at spaced locations on the corresponding surfaces of the layer like islands.

Figure 12:
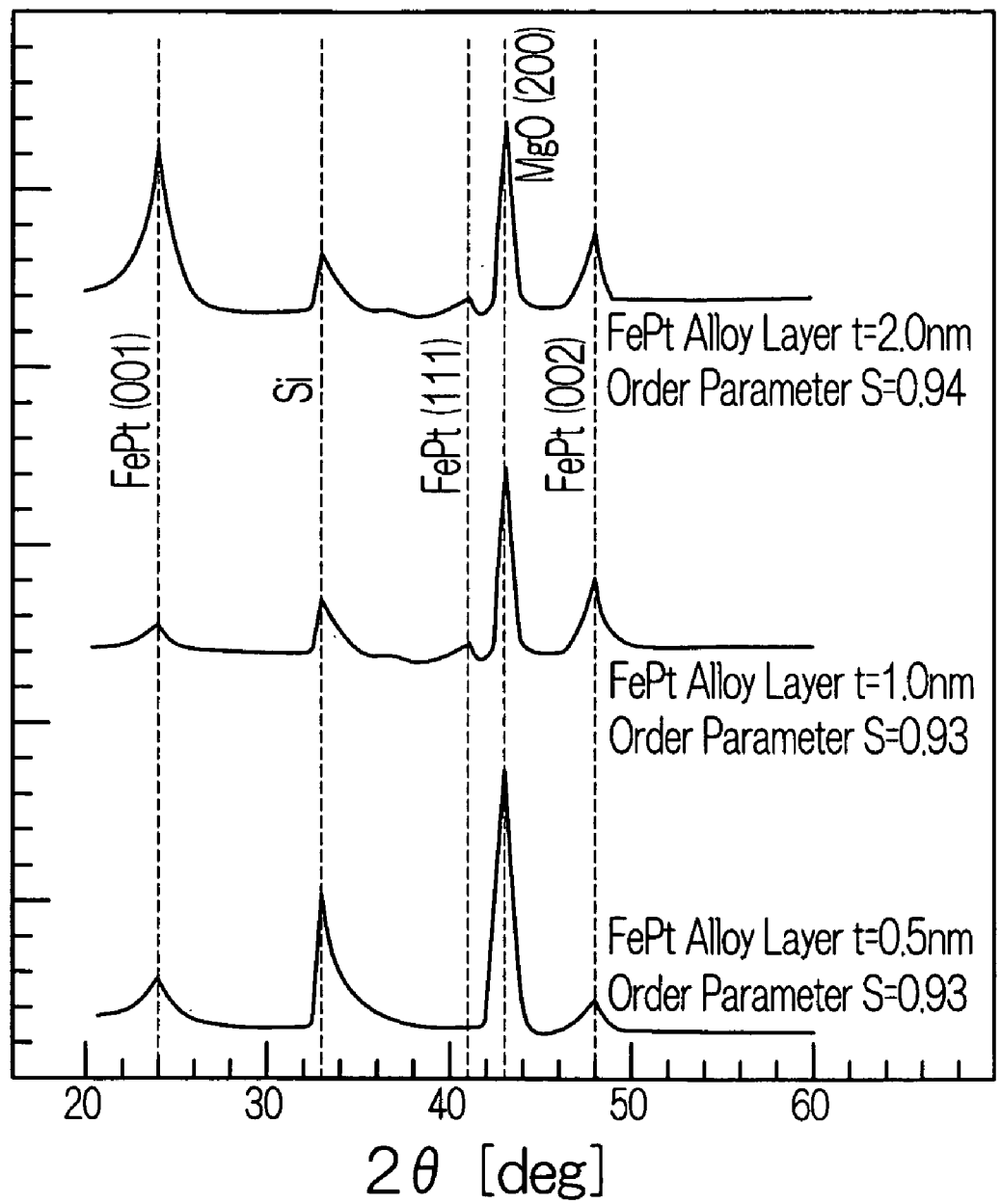
FIG. 12 is a graph specifying the orientation of the magnetic crystalline grains based on X-ray diffraction.

Next, the inventor has observed the magnetic crystalline grains 32, 36, 38 based on X-ray diffraction. As shown in FIG. 12, a peak has appeared to represent the (001) plane of the FePt alloy for the magnetic crystalline grains 32, 36, 38. Moreover, no peaks have been observed for the (111) plane of the FePt alloy. Specifically, it has been proven that the magnetic crystalline grains 32, 36, 38 are made of an ordered alloy. On the other hand, if the $Fe_{50}Pt_{50}$ alloy layer is formed to have a larger thickness t prior to heat treatment, a peak tends to appear to represent the (111) plane of the FePt alloy.

Figure 13:
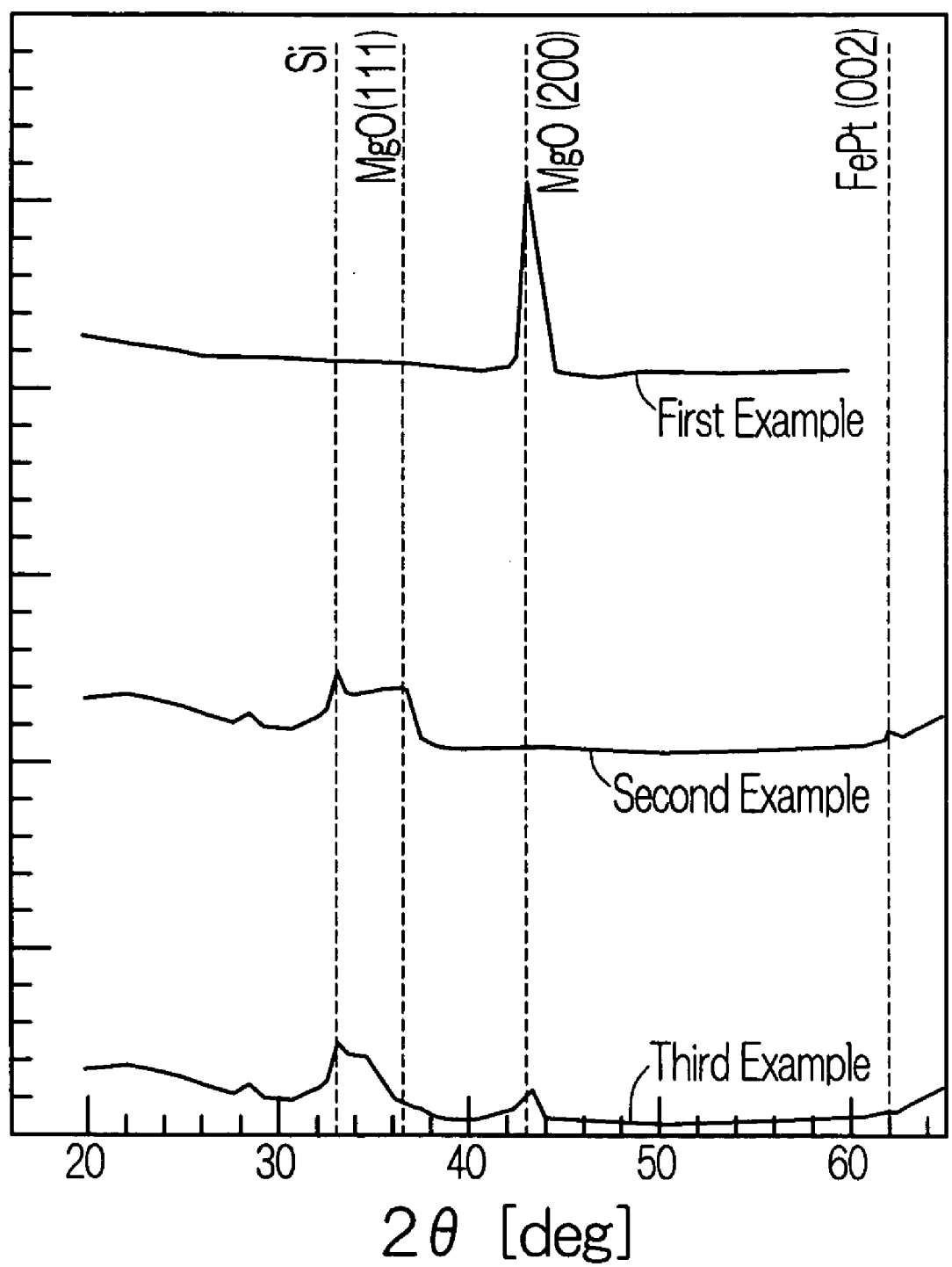
FIG. 13 is a graph specifying the orientation of the MgO based on X-ray diffraction.

Here, the inventor has observed the relationship between a MgO film and a FePt magnetic crystalline grains based on the X-ray diffraction. The inventor prepared three types of examples. The substrate was maintained at a room temperature in forming a MgO film of a first example in a chamber of the sputtering apparatus. Distance was set at 45.0 mm between the substrate and the MgO target within the chamber. The substrate was heated up to 500 degrees Celsius in forming a MgO film of a second example in the chamber. Distance was set at 45.0 mm between the substrate and the MgO target within the chamber. Similarly, the substrate was maintained at 500 degrees Celsius in forming a MgO film of a third example in the chamber. Distance was set at 100.0 mm between the substrate and the MgO target. As is apparent from FIG. 13, a peak was observed for the (200) plane of the MgO in the first example. On the other hand, no peaks were observed for the (200) plane of the MgO in the second and third examples. Formation of the MgO film at a room temperature has enabled to set the orientation of the MgO film in a predetermined single direction.

Figure 14:
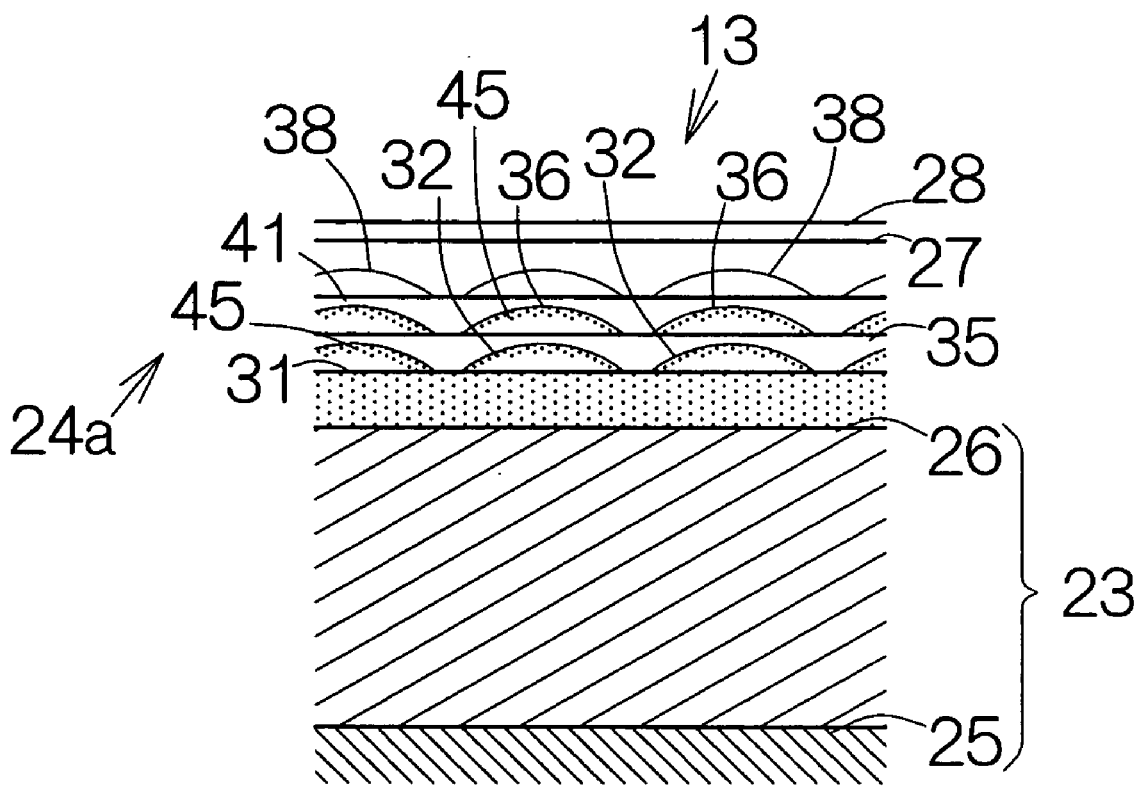
FIG. 14 is an enlarged partial sectional view for schematically illustrating in detail the structure of a polycrystalline structure film according to a second embodiment of the present invention.

FIG. 14 illustrates in detail the structure of a polycrystalline structure film 24a according to a second embodiment of the present invention. The polycrystalline structure film 24 includes a non-magnetic material 45 distributed on the surfaces of the magnetic crystalline grains 32, 36. The non-magnetic material 45 may be an oxide or nitride generated based on the atoms included in the magnetic crystalline grains 32, 36, as described later. Like reference numerals are attached to structures or components equivalent to those of the aforementioned first embodiment.

Figure 15:
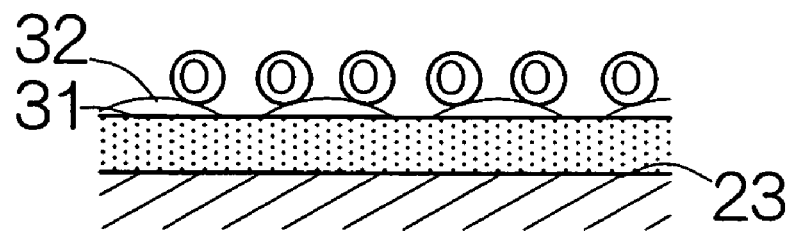
FIG. 15 is an enlarged partial sectional view of the substrate for schematically illustrating a process of forming oxides on the surfaces of the magnetic crystalline grains.

The first magnetic crystalline grains 32 including Fe and Pt atoms are formed on the surface of the base layer 31 in forming the polycrystalline structure film 24a in the aforementioned manner. As shown in FIG. 15, the surfaces of the magnetic crystalline grains 32 are then exposed to an oxygen atmosphere, for example. An oxygen gas or air may be introduced into the chamber so as to establish the oxygen atmosphere in the chamber, for example. The surfaces of the first magnetic crystalline grains 32 are thus subjected to oxidation. Oxides corresponding to the non-magnetic materials are generated on the surfaces of the magnetic crystalline grains 32. Alternatively, a nitrogen atmosphere may be established within the chamber. In this case, a nitrogen gas or air may be introduced into the chamber. Nitrides corresponding to the non-magnetic materials are generated on the surfaces of the first magnetic crystalline grains 32.

The crystalline layer 35 is formed on the surface of the base layer 31 in the same manner as described above. The first isolation layer is thus established. The second magnetic crystalline grains 36, the crystalline layer 41 and the third magnetic crystalline grains 38 are in this sequence formed on the surface of the first isolation layer. Here, the surfaces of the second magnetic crystalline grains 36 are exposed to an oxygen or nitrogen atmosphere prior to the formation of the crystalline layer 41. In this manner, oxides or nitrides corresponding to the non-magnetic materials are generated along the surface of the second magnetic crystalline grains 36.

Oxides or nitrides, namely the non-magnetic materials, are interposed between the first magnetic crystalline grains 32 and crystalline layer 35 as well as the second magnetic crystalline grains 36 and crystalline layer 41 during the formation of the second and third magnetic crystalline grains 36, 38. The non-magnetic materials serve to sufficiently reduce interfacial reaction between the first magnetic crystalline grains 32 and the crystalline layer 35. Likewise, interfacial reaction is sufficiently reduced between the second magnetic crystalline grains 36 and the crystalline layer 41. The orientation can thus reliably be maintained in the individual first and second magnetic crystalline grains 32, 36.

It should be noted that the axis of easy magnetization may be set in parallel with the surface of the substrate 23 within the magnetic crystalline grains 32, 36, 38 of the aforementioned polycrystalline structure film 24, 24a. In this case, the orientation should be established within the (100) plane for the $Fe_{50}Pt_{50}$ magnetic crystalline grains 32, 36, 38. This orientation can be established based on the orientation of the MgO. In addition, as long as the Si body 25 can be prevented from suffering from a chemical reaction, the surfaces of the substrate 23 need not be covered with the $SiO_2$ films 26. Furthermore, even if an ordered alloy such as $Fe_{50}Pd_{50}$ (atom %), $Co_{50}Pt_{50}$ (atom %), or the like, is employed to form the magnetic crystalline grains 32, 36, 38, in place of $Fe_{50}Pt_{50}$ (atom %), the aforementioned method can be utilized to form the polycrystalline structure film 24, 24a. The number of the isolation layer may depend on a permissible thickness of the polycrystalline structure film or magnetic recording layer in the polycrystalline structure film 24, 24a.

What is claimed is:

1. A polycrystalline structure film comprising:
   magnetic crystalline grains spaced from each other on a surface of a base layer;
   an amorphous material covering over the magnetic crystalline grains;
   an orientation controlling layer covering over the magnetic crystalline grains and the amorphous material on the base layer, said orientation controlling layer made of non-magnetic crystals oriented in a predetermined direction; and
   magnetic crystalline grains spaced from each other on a surface of the orientation controlling layer, said magnetic crystalline grains oriented in a predetermined direction.

2. The polycrystalline structure film according to claim 1, wherein said amorphous material comprises a non-magnetic material.

3. The polycrystalline structure film according to claim 2, wherein said magnetic crystalline grains are made of an ordered alloy.

4. The polycrystalline structure film according to claim 3, wherein said ordered alloy has $L1_0$ structure.

5. A magnetic recording medium comprising:
   a support member;
   a base layer extending along a surface of the support member;
   magnetic crystalline grains spaced from each other on a surface of the base layer;
   an amorphous material covering over the magnetic crystalline grains;
   an orientation controlling layer covering over the magnetic crystalline grains and the amorphous material on the base layer, said orientation controlling layer made of non-magnetic crystals oriented in a predetermined direction; and
   magnetic crystalline grains spaced from each other on a surface of the orientation controlling layer, said magnetic crystalline grains oriented in a predetermined direction.

6. A polycrystalline structure film comprising:

magnetic crystalline grains spaced from each other on a surface of a base layer, a non-magnetic material distributed over surfaces of the magnetic crystalline grains so as to cover over the magnetic crystalline grains, said non-magnetic material generated based on atoms included in the magnetic crystalline grains;

an orientation controlling layer covering over the magnetic crystalline grains and the non-magnetic material on the base layer, said orientation controlling layer made of non-magnetic crystals oriented in a predetermined direction; and magnetic crystalline grains spaced from each other on a surface of the orientation controlling layer, said magnetic crystalline grains oriented in a predetermined direction.

7. The polycrystalline structure film according to claim 6, wherein said magnetic crystalline grains are made of an ordered alloy.

8. A magnetic recording medium comprising:

a support member;

a base layer extending along a surface of the support member;

magnetic crystalline grains spaced from each other on a surface of a base layer;

a non-magnetic material distributed over surfaces of the magnetic crystalline grains so as to cover over the magnetic crystalline grains, said non-magnetic material generated based on atoms included in the magnetic crystalline grains;

an orientation controlling layer covering over the magnetic crystalline grains and the non-magnetic material on the base layer, said orientation controlling layer made of non-magnetic crystals oriented in a predetermined direction; and magnetic crystalline grains spaced from each other on a surface of the orientation controlling layer, said magnetic crystalline grains oriented in a predetermined direction.

9. The polycrystalline structure film according to claim 7, wherein said ordered alloy has $L1_0$ structure.

10. The polycrystalline structure film according to claim 1, wherein each of the magnetic crystalline grains has a contact surface contacting with the base layer, and said orientation layer covers whole surfaces of the magnetic crystalline grains except contact surfaces.

* * * * *